United States Patent [19]

Yamagata

[11] 3,743,940

[45] July 3, 1973

[54] FREQUENCY MEASURING CIRCUIT

[76] Inventor: Yasufumi Yamagata, c/o CoCo Research Inc. 17-8, Chuo-3, Nakano-ku, Tokyo, Japan

[22] Filed: Nov. 2, 1971

[21] Appl. No.: 194,982

[30] Foreign Application Priority Data
Nov. 4, 1970  Japan.............................. 45/96992

[52] U.S. Cl. ............................... 324/166, 324/78 E
[51] Int. Cl....... G01r 23/02, G01p 3/48, G01p 3/54
[58] Field of Search ................... 324/78 E, 78 J, 166

[56] References Cited
UNITED STATES PATENTS
3,553,597   1/1971   Bugay................................ 324/78 E

OTHER PUBLICATIONS

Caldwell et al.; Med. & Biol. Engl, Vol. 8, pp. 181–185.

*Primary Examiner*—Alfred E. Smith
*Attorney*—George B. Oujevolk

[57] ABSTRACT

A frequency measuring circuit having a circuit for producing a sawtooth wave signal of a peak value corresponding to the pulse interval of an input pulse at every arrival thereof, an analog memory for storing the peak value of the sawtooth wave signal, a switching circuit for picking up the peak value of the sawtooth wave signal and supplying it to the analog memory to be memorized therein and an output circuit for deriving the content stored in the analog memory.

5 Claims, 8 Drawing Figures

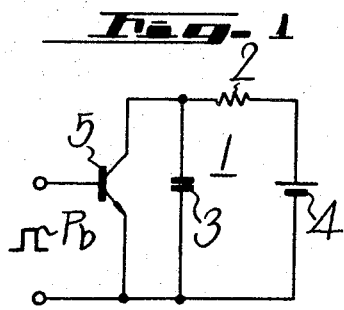
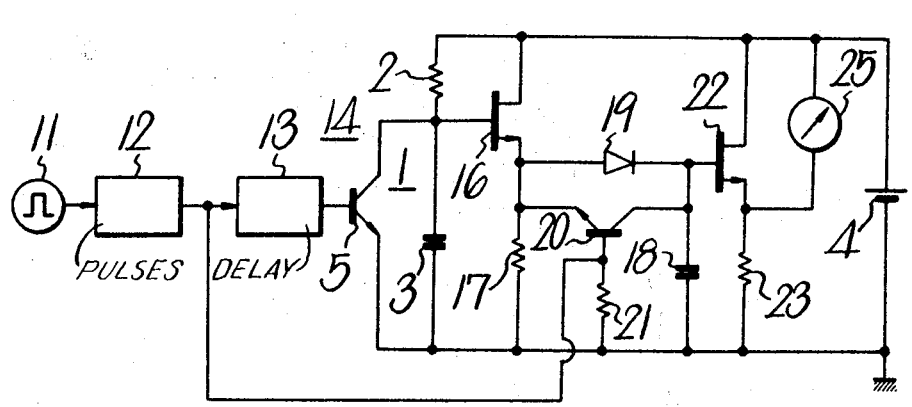

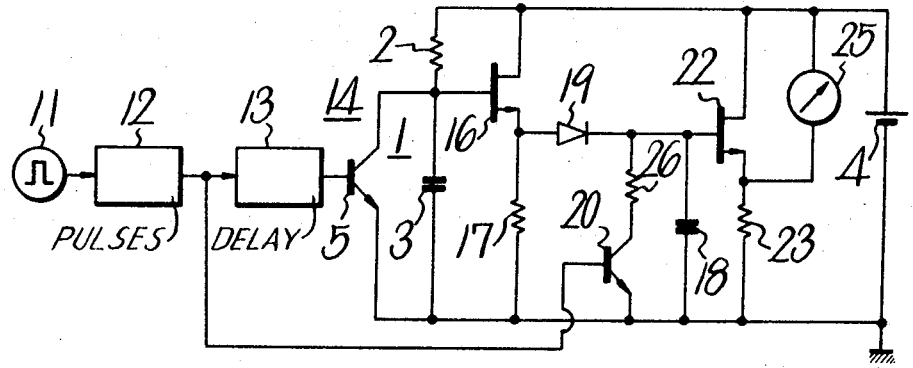

3,743,940

FREQUENCY MEASURING CIRCUIT

BACKGROUND OF THE INVENTION

1. Field of the Invention

This invention relates to a frequency measuring circuit, and more particularly to a frequency measuring circuit which is suitable for use as a tachometer for rotary members of extremely low speed.

2. Description of the Prior Art

A frequency measuring circuit is used, for example, as a tachometer, in which case a pulse generator is provided in association with the rotary member whose speed is to be measured and a pulse of a frequency proportional to the revolving speed of the rotary member is derived from the pulse generator and applied to a meter to indicate the revolving speed. Accordingly, in such a prior tachometer, the interval of the pulse from the pulse generator becomes longer with a decrease in the rotational speed of the rotary member, so that the needle of the meter swings and cannot provide accurate indication.

The indication of the meter can be stabilized by connecting a large-capacitance capacitor in parallel to the meter but this leads to the lowering of the response speed of the tachometer.

SUMMARY OF THE INVENTION

Accordingly, one object of this invention is to provide a frequency measuring circuit which is usable as a tachometer and, in such a case, capable of providing accurate indication of the rotational speed of a rotary member driven at a low speed.

Another object of this invention is to provide a frequency measuring circuit which is accurate in indication and high in response speed.

Another object of this invention is to provide a frequency measuring circuit which is capable of providing accurate measurement of the input pulse frequency even when the input pulse density is low.

Still another object of this invention is to provide a frequency measuring circuit which produces an analog signal, and hence is suitable for use in automatic control and in analog recording.

Other objects, features and advantages of this invention will become apparent from the following description taken in conjunction with the accompanying drawings.

BRIEF DESCRIPTION OF THE DRAWING

FIG. 1 is a connection diagram showing one example of a sawtooth wave signal generator circuit, for explaining this invention;

FIG. 2 is a connection diagram illustrating one example of a frequency measuring circuit of this invention;

FIGS. 3A to 3E are waveform diagrams, for explaining the operation of the frequency measuring circuit exemplified in FIG. 2; and FIG. 4 is a connection diagram illustrating a modified form of this invention.

DESCRIPTION OF THE PREFERRED EMBODIMENTS

In FIG. 1 there is shown one example of a sawtooth wave signal generator circuit which is usable in this invention. Reference numeral 1 indicates an integration circuit consisting of a resistor 2 and a capacitor 3 connected in series to each other. The integration circuit 1 is connected in parallel to a DC power source 4 and the capacitor 3 is connected in parallel between the collector and emitter of a switching transistor 5.

When no signal is applied to the base of the transistor 5, the transistor 5 is in the off state, so that when the integration circuit 1 is connected to the DC power source 4 at a time $t_0$, the capacitor 3 is charged to raise its voltage gradually as depicted in FIG. 3C. Then, upon application of such a pulse signal Pb as shown in FIG. 3B to the base of the transistor 5 at a time $t_2$, the transistor 5 is turned on momentarily. At this time, the capacitor 3 is discharged and its voltage lowers momentarily and then rises again due to charging. Similarly, upon application of the pulse Pb to the base of the transistor 5 at times $t_5$ and $t_7$, the transistors 5 turns on and off to repeat charging and discharging of the capacitor 3, thereby deriving from the collector of the transistor 5 a substantially sawtooth wave signal Sc such as shown in FIG. 3C in response to the pulse Pb.

In this case, if the period from $t_2$ to $t_5$ is longer than that from $t_0$ to $t_2$ as shown in FIG. 3, the peak value of the signal Sc at the time $t_5$ is greater than that at the time $t_2$ and if the period from $t_5$ to $t_7$ is shorter than that from $t_0$ to $t_2$, the peak value of the signal Sc at the time $t_7$ is smaller than that at the time $t_2$. Namely, the peak value of the signal Sc is a function of the interval of the pulse Pb. Accordingly, the interval of the pulse Pb can be known by measuring the peak value of the signal Sc.

The present invention is to measure the pulse frequency or period by making use of the relationhip between the interval of the pulse Pb and the peak value of the sawtooth wave signal Sc. Referring now to FIG. 2, one example of the present invention will hereinbelow be described as being applied to a tachometer for extremely low speed revolution.

In FIG. 2 reference numeral 11 indicates a pulse generator associated with a rotary member (not shown) whose revolving speed is to be measured and the pulse generator 11 produces a pulse signal of a pulse interval proportional to the rotational speed of the rotary member. The pulse signal derived from the pulse generator 11 is shaped by a pulse shaping circuit 12 such as a monostable multivibrator to provide a pulse signal Pa such as depicted in FIG. 3A. The pulse signal Pa is applied to a delay circuit 13 made up of, for example, a monostable multi-vibrator to produce a delayed pulse Pb such as shown in FIG. 3B, which is applied to the base of the transistor 5 of a sawtooth wave signal generator circuit 14 depicted in FIG. 1. Reference numeral 16 designates a field effect transistor (hereinafter referred to as a FET) which is of the source follower construction for impedance conversion the FET 16 having its gate connected to the collector of the transistor 5, its drain connected to the positive electrode of the power source 4 and its source connected to the negative electrode of the power source 4 through a resistor 17, that is, grounded.

Further, a capacitor 18 is provided as an analog memory and the source of the FET 16 is grounded through a series connection of a reverse current blocking diode 19 and the capacitor 18. The collector and emitter of the transistor 20 are connected to the diode 19 in the polarity opposite to that of the latter and the base of the transistor 20 is grounded through a resistor 21 and is supplied with the pulse Pa derived from the pulse shaping circuit 12.

Further, the connection point of the diode 19 with the capacitor 18 is connected to the gate of a FET 22, whose drain is connected to the positive electrode of the power source 4 and whose source is grounded through a resistor 23 and connected to the positive electrode of the power source 4 through a meter 25 for rotational speed indication.

With such an arrangement as above described, when the capacitor 3 is charged through the resistor 2 from the time $t_0$, the gate potential of the FET 16 rises with charging of the capacitor 3 as shown in FIG. 3C. Consequently, its source potential also rises, so that the capacitor 18 is also charged through the diode 19 and the gate potential of the FET 22 rises following charging of the capacitor 3 as shown in FIG. 3D. When the pulse Pa (FIG. 3A) is derived from the shaping circuit 12 at the time $t_1$ in response to the rotation of the rotary member, the transistor 20 is momentarily turned on by the pulse Pa but since the voltage of the capacitor 18 is substantially equal to the source potential of the FET 16, the charge stored in the capacitor 18 remains unchanged. Then, the transistor 5 is turned on by the delayed pulse Pb at the time $t_2$, so that the voltage of the capacitor 3 lowers to zero in an instant and then rises again as shown in FIG. 3C. Since the transistor 20 is in the off state at the time $t_2$, the charge stored in the capacitor 18 is not discharged through the transistor 20. Further, in the period from the time $t_2$ to $t_3$ the charging voltage of the capacitor 3 is low, so that the source potential of the FET 16 is lower than the charging voltage of the capacitor 18 and consequently the capacitor 18 is not charged through the diode 19. Therefore, in the period from the time $t_2$ to $t_3$ the voltage of the capacitor 18 is held constant at the peak value of the signal Sc at the time $t_2$ as depicted in FIG. 3D.

However, in the event that charging of the capacitor 3 continues and the source potential of the FET 16 exceeds the charging voltage of the capacitor 18 at the time $t_3$, the diode 19 is turned on and the voltage of the capacitor 18 rises corresponding to the source potential of the FET 16 from the time $t_3$.

Then, when the pulse Pb is produced by the revolution of the rotary member at the time $t_4$, the same operation as that carried out at the time $t_1$ is repeated. Accordingly, the gate potential of the FET 16 lowers to zero at the time $t_5$ and then rises again and the charging voltage of the capacitor 18 is held constant at the peak value of the signal Sc at the time $t_5$.

Then, when the pulse Pa is obtained at the time $t_6$, the transistor 20 is momentarily turned on by the pulse Pa. At this time, the charging voltage of the capacitor 3 is low and the source potential of the FET 16 is lower than the charging voltage of the capacitor 18, so that the charge stored in the capacitor 18 is discharged through the transistor 20 and when the voltage of the capacitor 18 becomes equal to the source potential of the FET 16, the discharge of the capacitor 18 stops. Then, when the transistor 5 is turned on by the pulse Pb at the time $t_7$, the voltage of the capacitor 3 once lowers to zero and then the capacitor 3 is charged again in the same manner as that above described. At the time $t_7$, the transistor 20 is already in the off state, so that the capacitor 18 is held at the voltage at the time $t_6$, namely at the peak value of the signal Sc at the time $t_6$.

Accordingly, the capacitor 18 is retained at the level of the signal Sc at every arrrival of the pulse Pa, so that the peak value of the signal Sc is stored or memorized in the capacitor 18 as shown in FIG. 3D. Since the voltage of the capacitor 18 is supplied to the meter 25 through the FET 18, the meter 25 is supplied with such a voltage as depicted in FIG. 3E in response to the interval of the pulse Pa, that is, the rotational speed of the rotary member, thus providing an indication of the rotational speed on the meter 25.

Thus, according to the present invention, the sawtooth wave signal Sc is derived from the pulse Pa representing the rotational speed in response to its pulse interval and the peak value of the signal Sc is memorized in the capacitor 18 until the arrival of the next subsequent pulse Pa and the memorized value is indicated, so that even if the revolving speed of the rotary member becomes low to lengthen the interval of the pulse Pa, the needle of the meter 25 does not swing but provides an accurate indication of the rotational speed. Further, the signal fed to the meter 25 momentarily responds to each pulse Pa and the response speed can be set at will by a selection of the density.

Further, the rotational speed can be accurately measured even if the interval of the pulse Pa becomes long, so that the number of the pulse Pa per one rotation of the rotary member may be small. In addition, since an analog output is derived from the source of the FET 22, the frequency measuring circuit of this invention is also applicable to an automatic control instrument and usable with an analog recorder such as a pen recorder.

In the foregoing the signal Sc is not completely sawtooth but curved, but in the case of reading the pulse cycle on a meter graduated with r.p.m. (revolution per minute), the graduation forms a hyperbola, so that the curvature of the signal Sc is cancelled approximately to facilitate reading of the meter.

FIG. 4 illustrates a modified form of this invention, in which a series connection of the collector and emitter of the transistor 20 and a resistor 26 is connected in parallel to the capacitor 18 and the value of the resistor 26 is made greater than the output impedance of the FET 16.

With such an arrangement, in the case where the source potential of the FET 16 is higher than the voltage of the capacitor 18, even if the transistor 20 is turned on, the capacitor 18 is charged through the diode 19, while if the source potential of the FET 16 is lower than the voltage of the capacitor 18, the capacitor 18 is not charged through the diode 19 but discharged through the diode 20. Accordingly, also in this example, the peak value of the signal Sc is stored in the capacitor 18 in the same manner as above described.

In FIG. 2 the diode 19 may be connected in parallel between the emitter and base of the transistor 20 and the sawtooth wave signal generator circuit 14 may be a Miller integration circuit, a bootstrap circuit or the like. Further, the meter 25 can be graduated in equal increment by the provision of a constant-current circuit for charging the capacitor 3 with a constant current to make the rising of the signal Sc linear and by the provision of an inverse number converter circuit between the FET 22 and the meter 25.

It is also possible to produce the sawtooth wave signal Sc by discharging the capacitor 3 instead of charging it.

Although the present invention has been described as being applied to a tachometer, the invention is applicable to a low-frequency meter, a speed meter and so on.

I claim as my invention:

1. In a low speed tachometer wherein a pulse generator is provided in association with a rotary member whose speed is to be measured, and a pulse of a frequency proportional to the revolving speed of the rotary member is derived from the pulse generator and applied to a meter to indicate the revolving speed, the improvement therein comprising:
   a. pulse forming means 11,12,13 which produces a pulse signal of a pulse interval proportional to the rotational speed of the rotary member;
   b. a sawtooth wave generator 1 fed by said pulse forming means including a saw tooth forming capacitor 3 and a charging transistor 5 with a collector and positive and negative power source terminals;
   c. a field effect transistor 16 couple to said generator 1, having a gate connected to said transistor collector, a drain connected to said positive terminal and a source connected to said negative terminal across a resistor 17;
   d. a blocking diode 19 connected to said source with a junction point, and an analog memory 18 connected to said source across said blocking diode 19 by being connected to said junction point;
   e. a switching transistor 20 connected to said junction point in opposite polarity to said blocking diode 19, including a base fed by said pulse forming means; and,
   f. a meter 25 in parallel between said field effect transisotr and said power source whereby the peak value of the generated sawtooth wave is stored in the analog memory which in turn feeds the meter 25 in response to pulse intervals corresponding to the speed of the rotary member.

2. A frequency measuring circuit as claimed in claim 1, which further includes a delay circuit for delaying the input pulse and applying it as an control signal to the sawtooth wave signal generator circuit, the input pulse being applied as a control signal to the switching circuit.

3. A frequency measuring circuit as claimed in claim 2, wherein the sawtooth wave signal generator circuit includes components acting as an integration circuit for integrating a voltage with respect to time and a switching element for discharging or charging the integrated voltage with the control signal.

4. A frequency measuring circuit as claimed in claim 3, wherein the sawtooth wave signal generator circuit includes a high input impedance circuit for deriving the integrated voltage from the integration circuit.

5. A frequency measuring circuit as claimed in claim 2, wherein the analog memory is a capacitor and the output circuit is a high impedance circuit.

* * * * *